United States Patent
Shiraishi et al.

(10) Patent No.: US 8,897,497 B2
(45) Date of Patent: Nov. 25, 2014

(54) OBJECT DETECTING DEVICE

(75) Inventors: Tatsuya Shiraishi, Susono (JP); Takeshi Nanami, Gotenba (JP); Naohide Uchida, Suntou-gun (JP); Hiroki Goto, Susono (JP); Masakazu Nishijima, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 491 days.

(21) Appl. No.: 13/259,583

(22) PCT Filed: May 18, 2010

(86) PCT No.: PCT/IB2010/001160
§ 371 (c)(1),
(2), (4) Date: Dec. 30, 2011

(87) PCT Pub. No.: WO2010/133946
PCT Pub. Date: Nov. 25, 2010

(65) Prior Publication Data
US 2012/0106786 A1 May 3, 2012

(30) Foreign Application Priority Data

May 19, 2009 (JP) ................. 2009-121265

(51) Int. Cl.
*G06K 9/00* (2006.01)
*G06F 17/10* (2006.01)
*B60Q 1/00* (2006.01)
*G01S 17/93* (2006.01)
*G01S 13/86* (2006.01)

(52) U.S. Cl.
CPC ............. *G01S 17/936* (2013.01); *G01S 13/867* (2013.01)

USPC ............................ 382/104; 340/435; 701/301

(58) Field of Classification Search
None
See application file for complete search history.

(56) References Cited

U.S. PATENT DOCUMENTS

| | | | |
|---|---|---|---|
| 5,410,346 A * | 4/1995 | Saneyoshi et al. | 348/116 |
| 5,530,420 A * | 6/1996 | Tsuchiya et al. | 340/435 |
| 6,191,704 B1 * | 2/2001 | Takenaga et al. | 340/903 |
| 6,882,303 B2 * | 4/2005 | Samukawa et al. | 342/70 |
| 7,141,796 B2 * | 11/2006 | Hattori et al. | 250/370.08 |
| 7,650,239 B2 * | 1/2010 | Samukawa et al. | 701/300 |

(Continued)

FOREIGN PATENT DOCUMENTS

| | | |
|---|---|---|
| EP | 1 947 475 | 7/2008 |
| JP | 2003 162710 | 6/2003 |
| JP | 2005 329779 | 12/2005 |
| WO | 03 001472 | 1/2003 |

OTHER PUBLICATIONS

International Search Report Issued Aug. 31, 2010 in PCT/IB10/001160 Filed May 18, 2010.

*Primary Examiner* — Wenpeng Chen
(74) *Attorney, Agent, or Firm* — Oblon, Spivak, McClelland, Maier & Neustadt, L.L.P.

(57) ABSTRACT

An object detecting device includes a camera ECU that detects an object from image data for a predetermined area has been captured by a monocular camera, a fusion processing portion that calculates the pre-correction horizontal width of the detected object, a numerical value calculating portion that estimates the length in the image depth direction of the calculated pre-correction horizontal width, and a collision determining portion that corrects the pre-correction horizontal width calculated by the fusion processing portion, based on the estimated length in the image depth direction.

9 Claims, 9 Drawing Sheets

(56) References Cited

U.S. PATENT DOCUMENTS

| | | | |
|---|---|---|---|
| 7,825,849 B2* | 11/2010 | Tsuchida et al. | 342/70 |
| 2001/0006554 A1* | 7/2001 | Kakinami | 382/104 |
| 2003/0002713 A1* | 1/2003 | Chen | 382/104 |
| 2004/0057599 A1* | 3/2004 | Okada et al. | 382/103 |
| 2004/0101162 A1* | 5/2004 | Higaki et al. | 382/103 |
| 2004/0117090 A1* | 6/2004 | Samukawa et al. | 701/45 |
| 2004/0119634 A1* | 6/2004 | Samukawa et al. | 342/70 |
| 2004/0178945 A1 | 9/2004 | Buchanan | |
| 2005/0004761 A1* | 1/2005 | Takahama et al. | 701/301 |
| 2005/0004762 A1* | 1/2005 | Takahama et al. | 701/301 |
| 2005/0093735 A1 | 5/2005 | Samukawa et al. | |
| 2005/0165550 A1* | 7/2005 | Okada | 701/301 |
| 2006/0114318 A1* | 6/2006 | Saka et al. | 348/61 |
| 2006/0115115 A1* | 6/2006 | Nagaoka et al. | 382/103 |
| 2006/0115121 A1* | 6/2006 | Saka et al. | 382/104 |
| 2007/0030131 A1* | 2/2007 | Takahama et al. | 340/435 |
| 2007/0032953 A1 | 2/2007 | Samukawa et al. | |
| 2007/0035385 A1* | 2/2007 | Miyahara | 340/435 |
| 2007/0127779 A1* | 6/2007 | Miyahara | 382/106 |
| 2007/0165910 A1* | 7/2007 | Nagaoka et al. | 382/104 |
| 2007/0286475 A1* | 12/2007 | Sekiguchi | 382/154 |
| 2008/0164985 A1* | 7/2008 | Iketani et al. | 340/435 |
| 2008/0199050 A1* | 8/2008 | Koitabashi | 382/107 |
| 2008/0278577 A1* | 11/2008 | Otsuka et al. | 348/113 |
| 2008/0300788 A1* | 12/2008 | Kanaboshi et al. | 701/301 |
| 2009/0015675 A1* | 1/2009 | Yang | 348/148 |
| 2009/0045999 A1 | 2/2009 | Samukawa et al. | |
| 2009/0135065 A1* | 5/2009 | Tsuchida et al. | 342/454 |
| 2009/0184845 A1* | 7/2009 | Saito | 340/937 |
| 2009/0201192 A1* | 8/2009 | Tokoro et al. | 342/70 |
| 2009/0248270 A1* | 10/2009 | Sekiguchi | 701/96 |
| 2009/0251355 A1* | 10/2009 | Nanami | 342/27 |
| 2010/0315214 A1* | 12/2010 | Yano et al. | 340/435 |
| 2011/0019873 A1* | 1/2011 | Yamato | 382/103 |

\* cited by examiner

OBJECT DETECTING DEVICE

BACKGROUND OF THE INVENTION

1. Field of the Invention

The invention relates to an object detecting device that detects an object based on an image captured by an imaging device.

2. Description of the Related Art

As related art, object detecting devices that detect the position and the like of another vehicle such as a leading vehicle or an oncoming vehicle are being used in collision prevention systems and the like in vehicles to avoid a collision with another vehicle. One example of such an object detecting device is a device that detects an object by a sensor fusion recognition process that combines an image captured by a camera with detection results of detection by radar.

With detection by radar, in principle, it is not possible to calculate the width of a detection target object (i.e., an object to be detected), but it is possible to obtain information about the distance to that object. On the other hand, with detection by a monocular camera, it is not possible to obtain the distance to a detection target object, but it is possible to detect the width and the like of the object. Sensor fusion is a method for detecting an obstacle by combining these kinds of functions of a plurality of sensors. In the past, various studies have been carried out regarding object detection by sensor fusion.

For example, Japanese Patent Application Publication No. 2005-329779 (JP-A-2005-329779) describes an obstacle recognition device that recognizes an obstacle in front of the host vehicle without being affected by the coordinates of a camera image being offset from the coordinates of a radar probe, by sensor fusion recognition processing in which there is no difference between the accuracy during the day and the accuracy during the night or the like.

Incidentally, in obstacle detection by this kind of sensor fusion, the distance to a detection target object is unable to be obtained with a monocular camera, so depending on the view from the monocular camera, the horizontal width of an object (i.e., the width in the direction of thickness of an object) that is long in the depth direction ahead (i.e., that extends into the distance) and curves ahead, such as a guardrail or a wall in front of the host vehicle, may end up being erroneously estimated as being thicker than it actually is. As a result, while the vehicle is traveling, the accuracy of the determination as to whether the object is an obstacle that requires an operational response (i.e., evasive action) by the host vehicle may decrease.

SUMMARY OF THE INVENTION

This invention thus provides an object detecting device capable of improving the accuracy of a determination as to whether an object in front of the host vehicle requires an operational response (i.e., evasive action) by the host vehicle, by accurately estimating the horizontal width of that object.

A first aspect of the invention relates to an object detecting device that includes image detecting means for detecting an object from image data for a predetermined area that has been captured; calculating means for calculating the horizontal width of the object detected by the image detecting means; estimating means for estimating the length in the image depth direction (i.e., the depth direction in the image; simply referred to as the "image depth direction" in this specification) of the object detected by the image detecting means; and correcting means for correcting the horizontal width of the object calculated by the calculating means, based on the length in the image depth direction estimated by the estimating means.

According to this structure, after the pre-correction horizontal width of the object has been calculated from the captured image data, it is then corrected based on the estimated length in the image depth direction. Therefore, the horizontal width of an object around a vehicle provided with the object detecting device (i.e., the host vehicle) can be more accurately estimated. As a result, it is possible to improve the accuracy of a determination that determines whether an object is an obstacle that requires an operational response (i.e., evasive action) by the host vehicle.

The object detecting device described above may also include radar detecting means for emitting electromagnetic waves within the predetermined area and obtaining a detection point of an object in the direction in which the electromagnetic waves are emitted. The image detecting means may detect the object from the image data based on the detection point obtained by the radar detecting means. According to this structure, the detection point is obtained using the electromagnetic waves from the radar detecting means, and an object is detected from the image data based on the obtained detection point. As a result, an object can be detected more accurately.

Also, in the object detecting device having this structure, a plurality of the detection points may be obtained by the radar detecting means. Also, the estimating means may estimate the length in the image depth direction of the object based on a difference between a first distance to a first detection point and a second distance to a second detection point obtained by the radar detecting means, and the first detection point and the second detection point may be within the range of the horizontal width of the object. According to this structure, the length in the image depth direction can be detected more accurately.

Also, the object detecting device having this structure may also include determining means for determining whether the object detected by the image detecting means is a vehicle. The correcting means may be inhibited from correcting the horizontal width if it is determined by the determining means that the object is a vehicle. According to this structure, if it is determined that the detected object is a vehicle, the horizontal width is not corrected, so the horizontal width related to an object with relatively no depth, such as the rear surface portion of a vehicle body of a vehicle, and in which the horizontal width does not need to be corrected can be detected more accurately.

Also, in the object detecting device having this structure, the determining means may determine whether the difference is equal to or greater than a fixed difference, and the correcting means may be inhibited from correcting the horizontal width if it is determined by the determining means that the object is a vehicle and it is not determined that the distance is equal to or greater than a fixed difference.

In the object detecting device having the structure described above, the predetermined area may be set based on the detection point obtained by the radar detecting means.

In the object detecting device having the structure described above, the image depth direction may be a direction from the image detecting means to the object, and the horizontal direction may be a direction orthogonal to the direction from the image detecting means to the object.

Further, the object detecting device having the structure described above may also include inclination obtaining means for obtaining the inclination of an object region occupied by the object in the image data of the object detected by the image detecting means, and the estimating means may estimate the length in the image depth direction of the object based on the inclination of the object region obtained by the obtaining means. According to this structure, when the inclination of the object region in the image data is greater than it is when the object is a vehicle, as it is with an object that is long in the depth direction (i.e., that extends into the distance) and curves ahead, such as a guardrail or a wall in front of the host vehicle, the length in the image depth direction is estimated accordingly. As a result, the length in the image depth direction can be more accurately detected.

In the object detecting device having this structure, the inclination of the object region may be the angle between the longitudinal direction of the object region and the horizontal direction of the image data. Also, the determining means may determine whether the inclination of the object region is greater than a predetermined value, and the correcting means may be inhibited from correcting the horizontal width if it is determined that the inclination of the object region is equal to or less than the predetermined value.

In the object detecting device having the structure described above, the object may be within the predetermined area.

Accordingly, this invention makes it possible to improve the determination accuracy when determining whether an object in front of the host vehicle requires an operational response (i.e., evasive action) by the host vehicle, by accurately estimating the horizontal width of that object.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Example embodiments of the present invention will be described in greater detail below with reference to the accompanying drawings.

First, the structure of an object detecting device according to a first example embodiment of the invention will be described with reference to FIG. 1, which is a block diagram of the object detecting device 10 according to the first example embodiment of the invention. The object detecting device 10 according to this example embodiment is a vehicle peripheral monitoring apparatus that is mounted in a vehicle (hereinafter referred to as the "host vehicle") such as an automobile, and improves the determination accuracy of a determination as to whether an object in front of the host vehicle is an obstacle that requires an operational response (i.e., evasive action) by the host vehicle, by more accurately estimating the horizontal width (i.e., the width in the direction of thickness) of the object. Examples of a predetermined detection target object that is to be detected as an object in front of the host vehicle include objects that are long in the depth direction and curve away into the distance ahead, such as a guardrail or wall in front of the vehicle, and obstacles such as fallen objects or other vehicles such as a leading vehicle or a vehicle in front of a leading vehicle.

Figure 1:
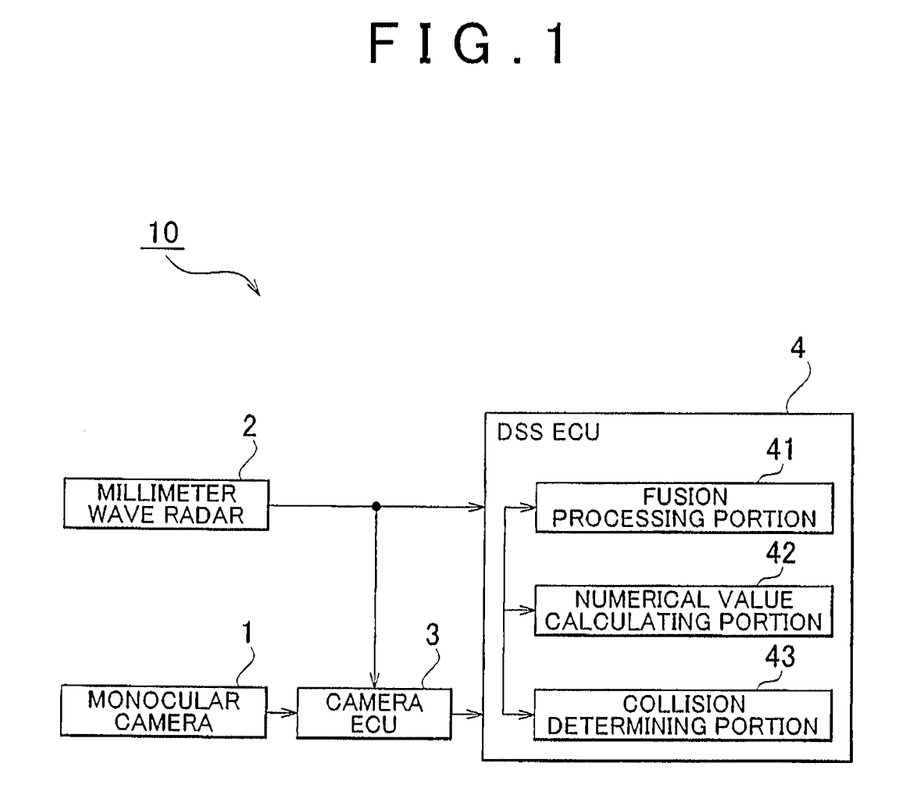
FIG. 1 is a block diagram showing an object detecting device according to a first example embodiment of the invention.

As shown in FIG. 1, the object detecting device 10 includes a monocular camera 1 (which is one example of image detecting means), millimeter wave radar 2 (which is one example of radar detecting means), a camera ECU 3 (which is one example of image detecting means), and a DSS (Driver Support System) ECU 4 (which is one example of calculating means). Incidentally, the camera ECU 3 and the DSS ECU 4 are each formed with an electronic control unit computer that includes a CPU, ROM, and RAM and the like as the main component.

The monocular camera 1 is an image capturing portion that is mounted to a front portion of the host vehicle and captures an image of an area in front of the host vehicle. The monocular camera 1 captures a predetermined area in front of the vehicle at predetermined intervals of time, creates image data for that area, and then successively outputs that created image data to the camera ECU 3.

The millimeter wave radar 2 is a radar detection portion that is mounted near the monocular camera 1 in a front portion of the host vehicle and detects an object in front of the host vehicle. The millimeter wave radar 2 horizontally and vertically scans radio waves in the millimeter waveband in the same area as the predetermined area in front of the host vehicle that is captured by the monocular camera 1, and obtains detection point data that includes distance data to an object in that area by detecting the reflected waves.

That is, the millimeter wave radar 2 emits radio waves in the millimeter waveband in a plurality of different directions within a predetermined area, and obtains detection point data that includes distance data to objects in the directions in which the radio waves are emitted. The millimeter wave radar 2 obtains the detection point data at predetermined intervals of time and successively outputs the obtained detection point data to the camera ECU 3 and the DSS ECU 4.

The camera ECU 3 is an image processing portion which, when an object in front of the host vehicle is detected by the millimeter wave radar 2, sets an image processing region that includes a predetermined detection target object from the image data based on the detection point data related to the detected object, and searches and detects (i.e., senses) the object by performing image processing for that image processing region. The camera ECU 3 is connected to the monocular camera 1 and obtains the image data output from the monocular camera 1. The camera ECU 3 then sets the image processing region from the image data based on the detection point data related to the object detected by the millimeter wave radar 2, and detects an image portion of the detection target, object that is in front of the host vehicle by image processing (such as edge analysis processing, luminance analysis processing, or optical flow processing) for that image processing region, and extracting the characteristic and the characteristic amount. The camera ECU 3 may employ any one of various well-known image processing methods to detect the image portion of the predetermined detection target object. Once the image portion of the detection target object is detected, the camera ECU 3 outputs the image data that includes the detected image portion to the DSS ECU 4.

In this example embodiment, the camera ECU 3 is connected to the millimeter wave radar 2 and obtains a multitude of detection point data output from the millimeter wave radar 2. The camera ECU 3 extracts the detection point data corresponding to the detection target object from this multitude of detection point data obtained from the millimeter wave radar 2, sets the image processing region, and detects the detection target object from the image by referencing the extracted detection point data. In this way, the object detection results from the millimeter wave radar 2 and the object detection results from the image are combined. Once the detection target object is detected, the camera ECU 3 outputs the detection point data identifying the detected detection target object to the DSS ECU 4.

The DSS ECU 4 is a sensor fusion processing portion that performs final sensing by calculating information such as the position of the detection target object and the width in the horizontal direction and the direction orthogonal to the direction from the monocular camera to the detected object (simply referred to as the "horizontal direction" in this specification) using the fusion data, i.e., the data resulting from fusing the detection point data and the image data. The DSS ECU 4 is connected to the millimeter wave radar 2 and the camera ECU 3, and obtains the detection point data output from the millimeter wave radar 2, as well as obtains image data that includes the detected image portion output from the camera ECU 3.

Here, the DSS ECU 4 calculates characteristic amount information such as the horizontal width and the position of the predetermined detection target object that is in front of the host vehicle by processing the detection point data and the image data, and corrects that information when necessary. Then, based on the calculation result, the DSS ECU 4 determines the likelihood of a collision between the host vehicle and the detection target object, and outputs the determination result to a brake portion, not shown, that performs brake control that controls a brake, also not shown, to apply braking force to the host vehicle.

Also, the DSS ECU 4 includes a fusion processing portion 41 (i.e., calculating means, inclination obtaining means), a numerical value calculating portion 42 (i.e., estimating means), and a collision determining portion 43 (i.e., correcting means, determining means).

The fusion processing portion 41 is a portion that performs a calculation process of calculating and storing the position and horizontal width (i.e., the width in the thickness direction) of the detection target object detected by the monocular camera 1 and the camera ECU 3. The specific method for calculating the horizontal width will be described later.

Also, the fusion processing portion 41 is able to obtain and store the inclination of the object region in the image data for the detection target object detected by the monocular camera 1 and the camera ECU 3. The inclination of the object region in the image data may also be extracted by performing luminance analysis processing for obtaining luminance information or by performing optical flow processing. The specific method for calculating the inclination of the object region in the image data will be described later.

The numerical value calculating portion 42 is a portion that performs a calculation process that calculates and estimates a physical value such as the length in the image depth direction of the object detected by the monocular camera 1 and the camera ECU 3. Here, the length in the image depth direction refers to the length that indicates how far the shape of the detection target object having this horizontal width extends in the longitudinal direction of the host vehicle. The specific method for calculating the length in the image depth direction will be described later.

Also, the numerical value calculating portion 42 is able to perform calculation processing that estimates and stores a length D in the image depth direction, that will be described later, based on the difference between a first distance to a detection point P1, to be described later, indicated by first detection point data of an object in the image data obtained by the millimeter wave radar 2, and a second distance to a detection point P3, to be described later, indicated by second detection point data of that object. Incidentally, the detection point P1 and the detection point P3 are detection points that are included in the range of the horizontal width calculated by the fusion processing portion 41.

Moreover, the numerical value calculating portion 42 is able to estimate and store the length in the image depth direction based on the inclination of the object region in the image data obtained by the fusion processing portion 41.

The collision determining portion 43 is a portion that performs a calculation process that corrects the horizontal width calculated by the fusion processing portion 41, using the detection point data and the image data, based on the length of the image depth direction estimated by the numerical value calculating portion 42, and stores that corrected horizontal width, and then determines whether the host vehicle C will collide with an obstacle unless the host vehicle C responds appropriately, i.e., takes evasive action (i.e., the collision determining portion 43 makes a collision determination). The specific method for correcting the horizontal width will be described later.

Also, the collision determining portion 43 is able to determine whether the detection target object detected by the monocular camera 1 and the camera ECU 3 is a vehicle by performing pattern matching. If it is determined that the detection target object is a vehicle, the collision determining portion 43 will be inhibited from correcting the horizontal width (i.e., or if the horizontal width has already been corrected, the collision determining portion 43 will return that horizontal width to the pre-correction horizontal width).

Figure 2:
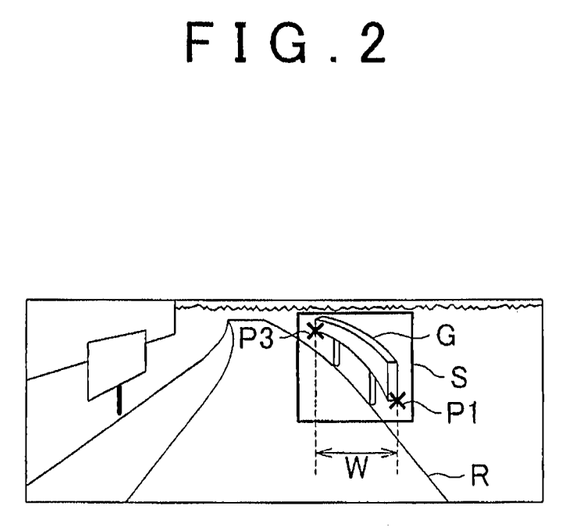
FIG. 2 is a view illustrating a pre-correction horizontal width as the horizontal width that is temporarily calculated using a monocular camera and a camera ECU.
Figure 3:
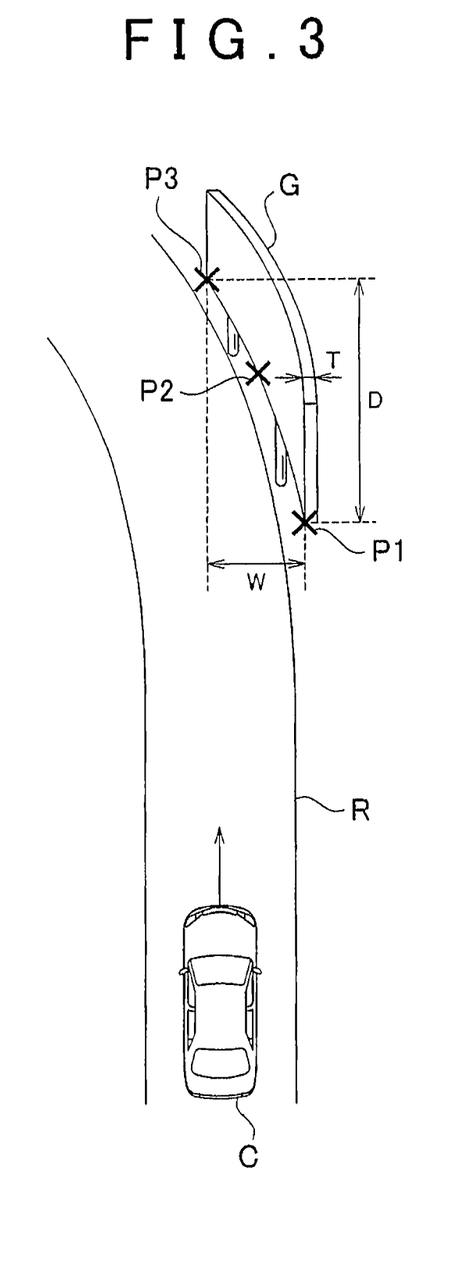
FIG. 3 is a view illustrating a method for calculating the horizontal width and the length in the image depth direction.

Next, the method for calculating (and correcting) the horizontal width and the method for calculating the length in the image depth direction related to that horizontal width, will be described with reference to FIGS. 2 and 3. FIG. 2 is a view showing the pre-correction horizontal width W as the horizontal width temporarily calculated using the monocular camera 1 and the camera ECU 3. FIG. 3 is a view illustrating a method for calculating the horizontal width and the length in the image depth direction. Here, a case will be assumed in which the host vehicle C is traveling on a road R that curves ahead to the left, and a guardrail G that is long in the depth direction (i.e., that extends into the distance) and curves ahead to the left is provided on the right side of the road R at the curve.

First, the fusion processing portion 41 calculates the position and horizontal width (i.e., the length of an object in the width direction of the host vehicle) of a guardrail G as the detection target object detected using the monocular camera 1 and the camera ECU 3, as shown in FIG. 2. The guardrail G is within an image detection result region S that is a region indicated by the result detected as the detection target object by the monocular camera 1 and the camera ECU 3. The pre-correction horizontal width W is calculated as a temporarily calculated horizontal width, based on the difference between the detection point P1 that is the end of the guardrail G that is farthest to the right in FIG. 2 and the detection point P3 that is the end of the guardrail G that is farthest to the left in FIG. 2 that are obtained by the monocular camera 1 and the camera ECU 3 which are unable to obtain the distance to the guardrail G.

Next, the numerical value calculating portion 42 estimates the length D in the image depth direction of the guardrail G detected by the monocular camera 1 and the camera ECU 3, as shown in FIG. 3. Here, the length D in the image depth direction of the guardrail G is the length indicating how far the shape of the guardrail G extends in the longitudinal direction of the host vehicle C (i.e., the direction from the monocular camera 1 to the guardrail G. More specifically, the numerical value calculating portion 42 estimates the length D in the image depth direction based on the difference between a first distance from the host vehicle C to the detection point P1 indicated by the first detection point data and a second distance from the host vehicle C to the detection point P3 indicated by the second detection point data obtained by the millimeter wave radar 2. Here, when the length D in the image depth direction is estimated, it can be estimated more accurately by additionally using a third distance from the host vehicle C to a detection point P2 indicated by third detection point data. Incidentally, these detection points P1, P2, and P3 are detection points that are included in the horizontal width W calculated by the fusion processing portion 41.

Next, the collision determining portion 43 uses the first distance to the detection point P1 indicated by the first detection point data, the second distance to the detection point P3 indicated by the second detection point data, and the third distance to the detection point P2 indicated by the third detection point data to correct the pre-correction horizontal width W calculated by the fusion processing portion 41, based on the length D in the image depth direction estimated by the numerical value calculating portion 42.

More specifically, the collision determining portion 43 first determines whether there is a detection point (such as the detection point P2) within the pre-correction horizontal width W. If there is such a detection point (in this case, the detection point P2), the collision determining portion 43 determines whether this detection point (the detection point P2 in this case) is separated by a predetermined distance or more from a detection point (in this case detection point P3) that is farther away than that detection point (i.e., detection point P2 in this case), from among the detection points (such as the detection point P1 and the detection point P3) that form the pre-correction horizontal width W. If these determination points (here the determination point P2 and the determination point P3) are separated by a predetermined distance or more, the collision determining portion 43 performs processing to correct the pre-correction horizontal width W obtained from the image (i.e., makes a correction to eliminate the effect from the image region corresponding to the detection point P2 and the detection point P3 in the pre-correction horizontal width W). The pre-correction horizontal width W calculated by the fusion processing portion 41 is ultimately corrected to a post-correction horizontal width T by repeating this processing, based on a plurality of detection points such as the detections points P1 to P3.

Incidentally, the collision determining portion 43 may also be structured to determine whether the object detected by the millimeter wave radar 2 is an object that has a depth equal to or greater than a predetermined distance in the depth direction (such as a guardrail or a barrier wall), and perform correction processing on the pre-correction horizontal width W if it is determined that the millimeter wave detected object is an object having such a depth. If the collision determining portion 43 is structured in this way, the collision determining portion 43 may also determine that the millimeter wave detected object has the depth described above if a detection point group formed from a plurality of detection points that are separated by a predetermined distance or more exists for a predetermined period of time or longer for a given object.

Figure 4:
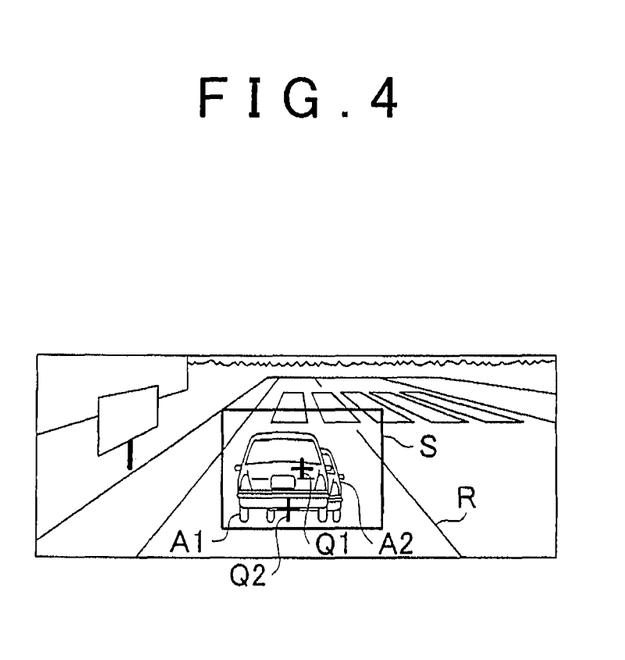
FIG. 4 is a view of one example of image data obtained using the monocular camera and camera ECU when there is a leading vehicle and a vehicle in front of the leading vehicle.
Figure 5:
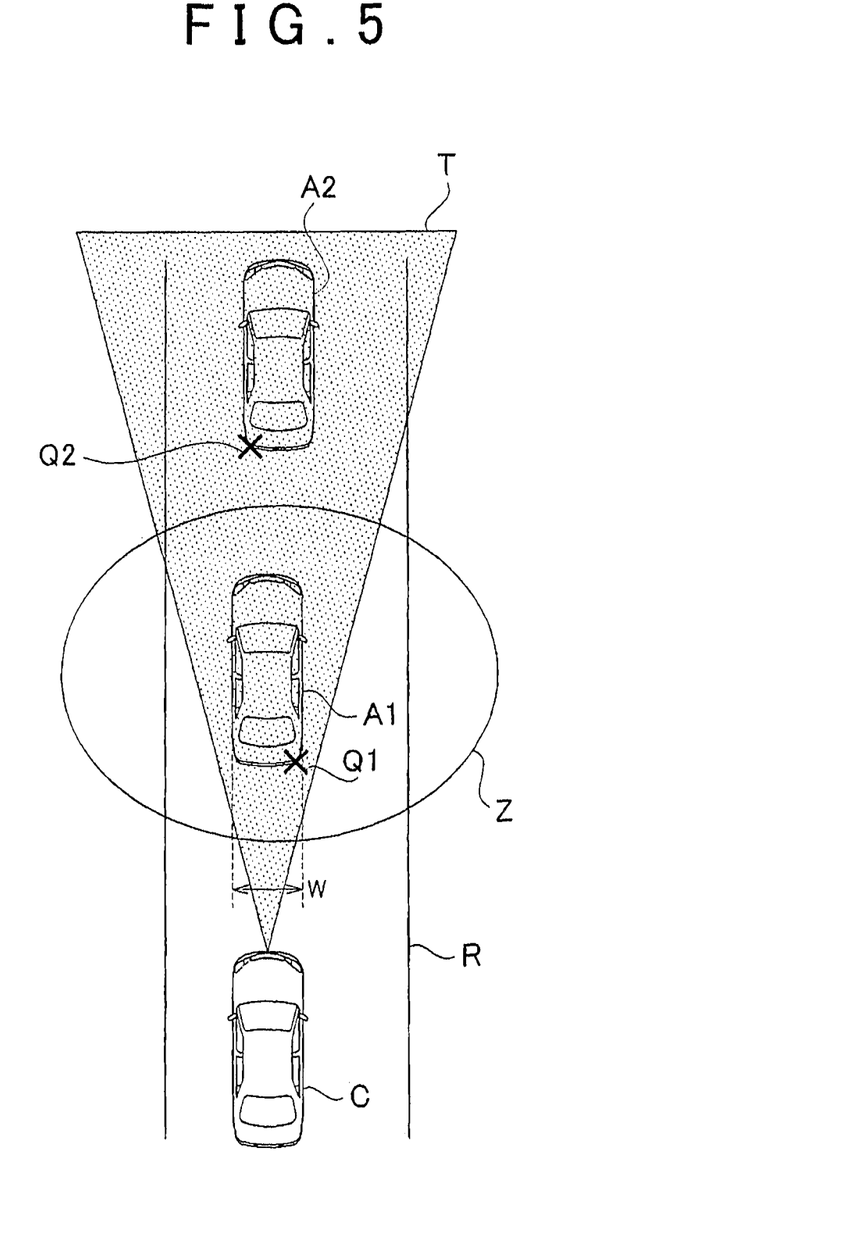
FIG. 5 is a view of a method for calculating the horizontal width when there is a leading vehicle and a vehicle in front of the leading vehicle.

Next, the method for calculating (and correcting) the horizontal width when there is a leading vehicle and a vehicle in front of a leading vehicle in front of the host vehicle C will be described with reference to FIGS. 4 and 5. FIG. 4 is a view of one example of image data obtained using the monocular camera 1 and camera ECU 3 when there is a leading vehicle A1 and a vehicle A2 in front of the leading vehicle A1, and FIG. 5 is a view of a method for calculating the horizontal width when there is a leading vehicle A1 and a vehicle A2 in front of the leading vehicle A1. Here, a case will be assumed in which the host vehicle C is traveling on a straight road R, and a leading vehicle A1 and a vehicle A2 in front of the leading vehicle A1 are in front of the host vehicle C.

First, the collision determining portion 43 determines whether a detection target object (i.e., the leading vehicle A1 or the vehicle A2 in front of the leading vehicle A1) within the image detection result region S described above is a vehicle by performing pattern matching, as shown in FIG. 4. If it is determined that the detection target object within the image detection result region S is a vehicle, the collision determining portion 43 is inhibited from correcting the pre-correction horizontal width W related to the leading vehicle A1 within the monitored area Z closest to the host vehicle C, within a detection target area T of the millimeter wave radar 2, but instead sets it as the post-correction horizontal width T, as shown in FIG. 5.

On the other hand, if it is determined that the detection target object within the image detection result region S is not a vehicle, the numerical value calculating portion 42 estimates a millimeter wave target-to-target distance, i.e., the difference between a first distance to a detection point Q1 indicated by first detection point data and a second distance to a detection point Q2 indicated by second detection point data obtained by the millimeter wave radar 2, as shown in FIG. 5. The collision determining portion 43 then determines whether the millimeter wave target-to-target distance estimated by the numerical value calculating portion 42 is equal to or greater than a fixed distance (such as 5 meters). If it is determined that the millimeter wave target-to-target distance is equal to or greater than the fixed distance, the collision determining portion 43 is inhibited from correcting the pre-correction horizontal width W related to the leading vehicle A1 within the monitored area Z closest to the host vehicle C within the detection target area T of the millimeter radar 2, but instead sets it as the post-correction horizontal width T, as shown in FIG. 5.

Figure 6:
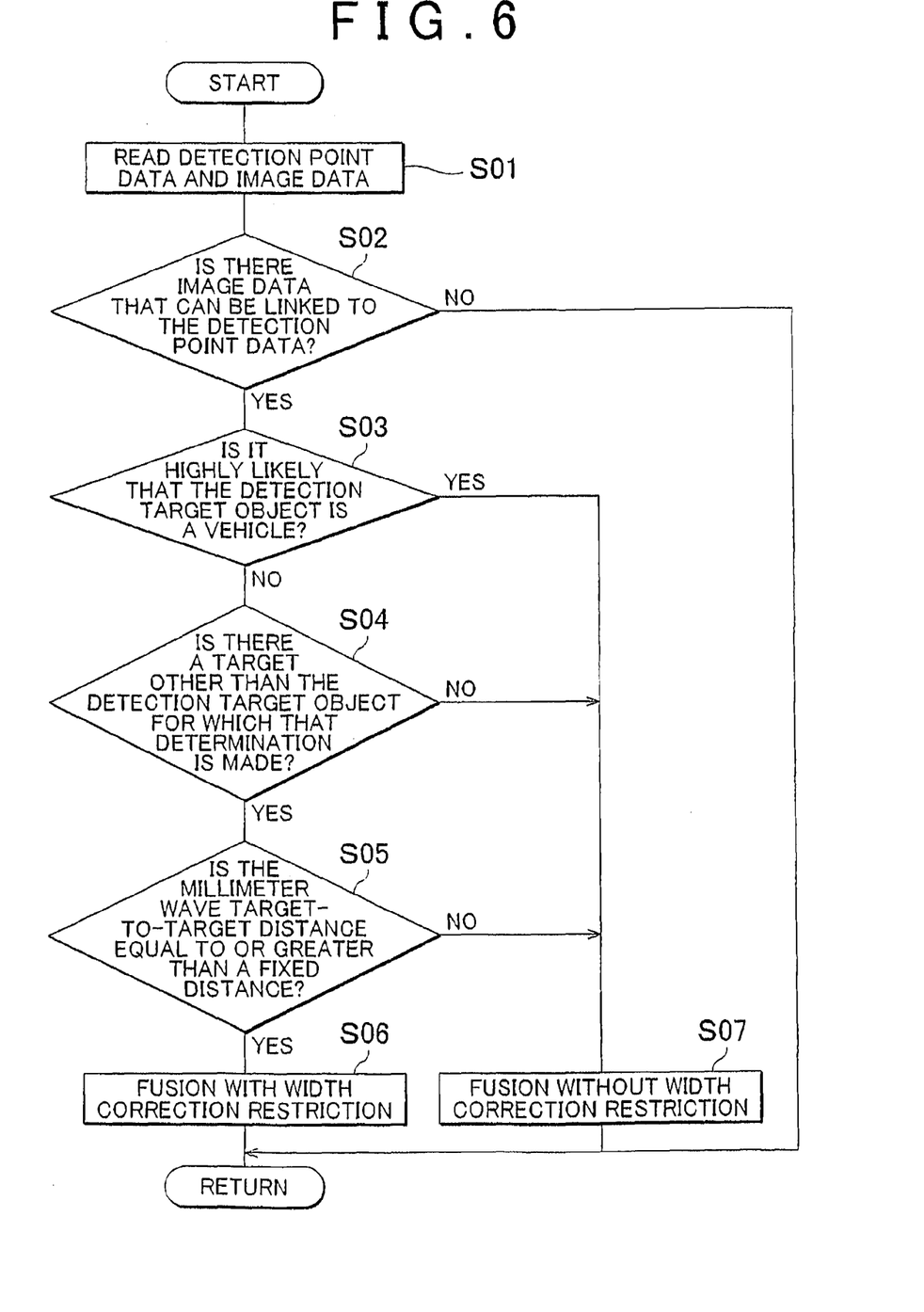
FIG. 6 is a flowchart illustrating a routine executed in the object detecting device.

Next, the operation of the object detecting device 10 will be described with reference to FIG. 6, which is a flowchart illustrating a routine executed in the object detecting device 10. This routine is executed repeatedly from the time that the engine is started until the time that the engine is shut off.

First, in step S01, the camera ECU 3 reads and obtains the detection point data output from the millimeter wave radar 2 and the image data output from the monocular camera 1.

Next, in step S02, the camera ECU 3 determines whether there is image data that can be linked to a plurality of detection point data obtained from the millimeter wave radar 2. If it is not determined that there is image data that can be linked to the plurality of detection point data, this cycle of the routine ends. If, on the other hand, it is determined that there is image data that can be linked to the plurality of detection point data, then the camera ECU 3 extracts the detection point data corresponding to a detection target object from the plurality of detection point data, and detects the detection target object by referencing the extracted detection point data. Then the fusion processing portion 41 calculates the pre-correction horizontal width W related to this detection target object and the numerical value calculating portion 42 estimates the length D in the image depth direction of this detection target object.

Next, in step S03, the collision determining portion 43 determines whether there is a high probability that the detection target object is a vehicle by performing pattern matching. If it is determined that there is a high probability that the detection target object is a vehicle, the process proceeds on to step S07 which will be described later. If, on the other hand, it is not determined that there is a high probability that the detection target object is a vehicle, the process proceeds on to step S04 which will be described next.

In step S04, the fusion processing portion 41 determines whether there is a detection target object that is an object other than the detection target object for which the determination in step S03 is made, within the image detection result region S. If it is not determined that there is a detection target object that is an object other than the detection target object for which the determination in step S03 is made, the process proceeds on to step S07 which will be described later. If, on the other hand, it is determined that there is a detection target object that is an object other than the detection target object for which the determination in step S03 is made, the process proceeds on to step S05 which will be described next.

In step S05, the numerical value calculating portion 42 determines whether a millimeter wave target-to-target distance that is the difference between the first distance to a detection point (such as the detection point Q1) indicated by the first detection point data and a second distance to a detection point (such as the detection point Q2) indicated by the second detection point data is equal to or greater than a fixed distance (such as five meters). If it is not determined that the millimeter wave target-to-target distance is equal to or greater than the fixed distance, the process proceeds on to step S07 which will be described later. If, on the other hand, it is determined that the millimeter wave target-to-target distance is equal to or greater than the fixed distance, the process proceeds on to step S06 which will be described next.

In step S06, the collision determining portion 43 uses the first distance to the detection point indicated by the first detection point data, the second distance to the detection point indicated by the second detection point data, a third distance to a detection point indicated by third detection point data, and image data that will be described later to correct the pre-correction horizontal width W calculated by the fusion processing portion 41, based on the length D in the image depth direction estimated by the numerical value calculating portion 42. That is, the collision determining portion 43 performs a correction restriction that corrects the pre-correction horizontal width W calculated by the fusion processing portion 41 to the post-correction horizontal width T, based on the detected detection points.

In step S07, the collision determining portion 43 is inhibited from correcting the pre-correction horizontal width W calculated by the fusion processing portion 41 (i.e., does not perform a correction restriction), but instead sets it as the post-correction horizontal width T.

Next, a method for obtaining the inclination of an object region in image data in an object detecting device according to a second example embodiment of the invention will be described with reference to FIGS. 7A to 7D and FIGS. 8A to 8D. FIGS. 7A to 7D are views illustrating a method for obtaining the inclination of an object region in image data of a guardrail G in an object detecting device according to the second example embodiment of the invention, and FIGS. 8A to 8D are views illustrating a method for obtaining the inclination of an object region in image data of a preceding vehicle A1 in the object detecting device according to the second example embodiment of the invention. The object detecting device 10 in this example embodiment has the same structure as that shown in FIG. 1, and performs processing that differs from the processing in the first example embodiment only with regards to estimating the length D in the image depth direction.

Figure 7A:
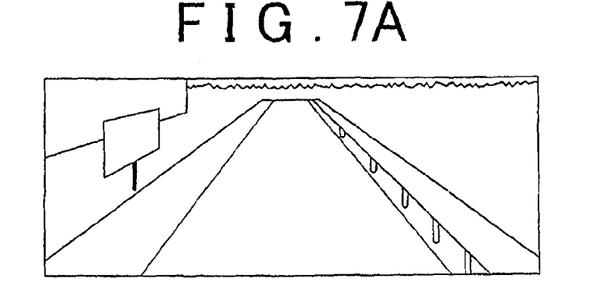
FIGS. 7A to 7D are views illustrating a method for obtaining the inclination of an object region in image data of a guardrail in an object detecting device according to a second example embodiment of the invention.
Figure 7B:
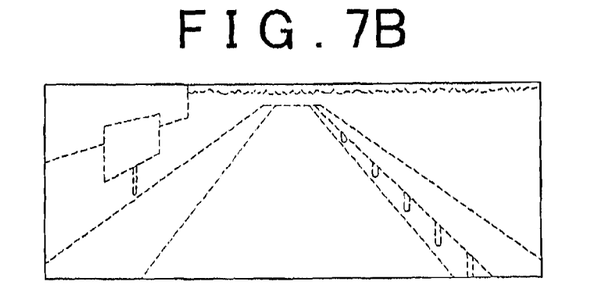

First, the method for obtaining the inclination of the object region in the image data of the guardrail G will be described with reference to FIG. 7A to 7D. First, the monocular camera 1 creates image data, as shown in FIG. 7A. Then the camera ECU 3 extracts the characteristic amount in this image data by performing edge analysis process, lamination analysis processing, or optical flow processing or the like on this image data, as shown by the broken lines in FIG. 7B.

Figure 7C:
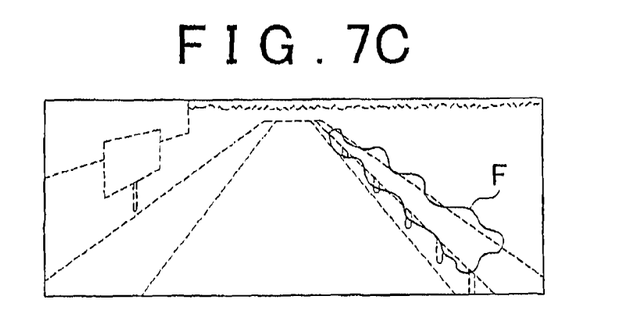
Figure 7D:
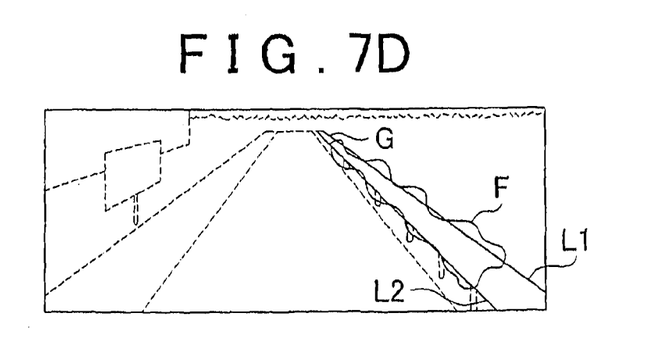

Next, the camera ECU 3 performs labeling that assigns a label F to a region that can be labeled (i.e., a process that determines that a given object is a given object), as shown in FIG. 7C, based on the extracted characteristic amount. Then the camera ECU 3 performs a linear fitting process on the portion of the labeled region where straight lines such as a straight line L1 and a straight line L2 can be fitted (i.e., applied), as shown in FIG. 7D. As a result, the object region, i.e., the region surrounded by the straight lines, is specified. The camera ECU 3 then calculates the inclination in the image, which is the inclination of the object region in this image data, by performing straight-line approximation by the least squares method or the like on the pixels in this object region. Then the camera ECU 3 compares the size of this calculated inclination in the image with a preset threshold value (i.e., an empirically obtained angle, such as several tens of degrees, related to the inclination when the object region has a length of equal to or greater than a predetermined value). Here, the inclination in the image is an angle created by the longitudinal direction of the object region and the horizontal direction (i.e., the sideways direction) in the image, or the longitudinal direction of the object region and the vertical direction (i.e., the lengthwise direction) in the image. This inclination in the image may also be, for example, an angle created by the straight line L2 and the horizontal direction in FIG. 7D, or an angle created by the straight line L2 and the horizontal direction in FIG. 7D. Here, the size of the calculated inclination in the image is determined to be greater than the preset threshold value (or equal to or greater than the threshold value), so it is estimated that the object has a length that is equal to or greater than a predetermined value in the image depth direction (i.e., the horizontal width in the image is estimated to be longer than the actual width of the object), and thus, the correction described above is made.

Figure 8A:
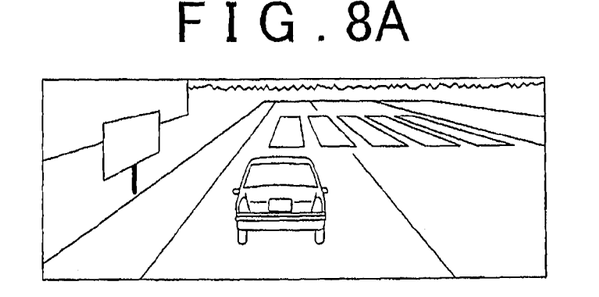
FIGS. 8A to 8D are views illustrating a method for obtaining the inclination of an object region in image data of a preceding vehicle.
Figure 8B:
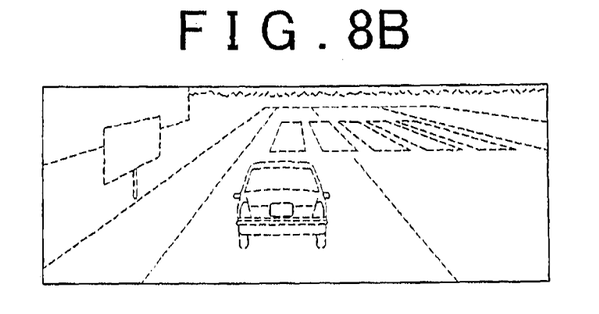

Continuing on, the method for obtaining the inclination in the image of the object region in the image data of the leading vehicle A1 will be described with reference to FIGS. 8A to 8D. First, the monocular camera 1 creates image data, as shown in FIG. 8A. Then the camera ECU 3 extracts a characteristic of this image data by performing edge analysis processing, lamination analysis processing, or optical flow processing or the like on this image data, as shown by the broken lines in FIG. 8B.

Figure 8C:
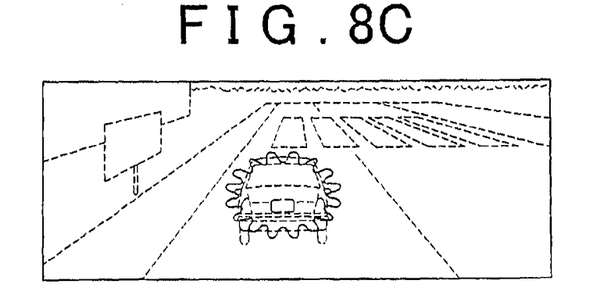
Figure 8D:
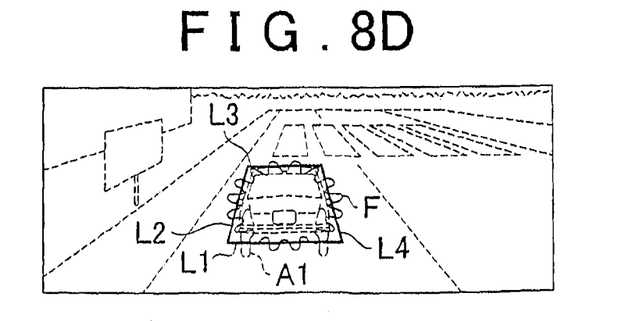

Next, the camera ECU 3 performs labeling that assigns a label to a region that can be labeled (i.e., a process that determines that a given object is a given object), as shown in FIG. 8C, based on the extracted characteristic. Then the camera ECU 3 performs a linear fitting process on the portion of the labeled region where straight lines such as a straight line L1, a straight line L2, a straight line L3, and a straight line L4 can be fitted (i.e., applied), as shown in FIG. 8D. As a result, the object region, i.e., the region surrounded by the straight lines, is specified. The camera ECU 3 then calculates the inclination in the image, which is the inclination of the object region in this image data, by performing straight-line approximation by the least squares method or the like on the pixels in this object region. Then the camera ECU 3 compares the size of this calculated inclination in the image with a preset threshold value (i.e., an empirically obtained angle, such as several tens of degrees, related to the inclination when the object region has a length of equal to or greater than a predetermined value). Here, the size of the calculated inclination in the image is determined to be less than the preset threshold value (or equal to or less than the threshold value), so it is estimated that the length in the image depth direction of the object is less than a predetermined value (i.e., the horizontal width in the image is estimated to be appropriate), and thus, the correction described above is not made.

Figure 9:
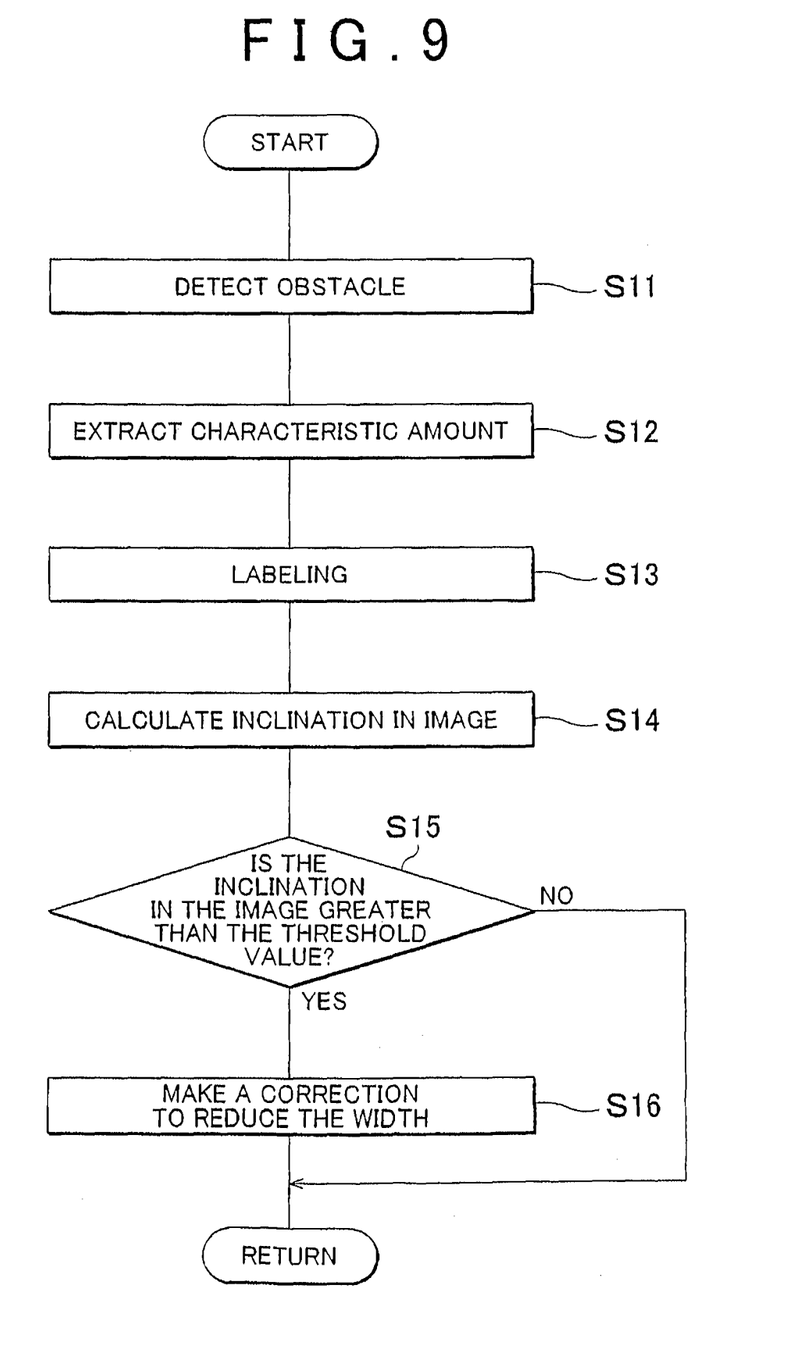
FIG. 9 is a flowchart illustrating a routine executed in the object detecting device.

Next, the operation of the object detecting device 10 will be described with respect to FIG. 9, which is a flowchart illustrating a routine executed in the object detecting device 10. This routine is executed repeatedly from the time that the engine is started until the time that the engine is shut off.

First in step S11, the camera ECU 3 detects an obstacle by reading and obtaining detection point data output from the millimeter wave radar 2 and image data output from the monocular camera 1.

Then, in step S12, the camera ECU 3 extracts the characteristic amount in the image data by performing edge analysis processing, lamination analysis processing, or optical flow processing or the like on the image data.

Next, in step S13, the camera ECU 3 labels a region that can be labeled (i.e., a process that determines that a given object is a given object), based on the extracted characteristic amount.

Then in step S14, the camera ECU 3 performs linear fitting on the portion of the labeled region where straight lines such as the straight line. L1 and the straight line L2 can be fitted (i.e., applied). As a result, the object region, i.e., the region surrounded by the straight lines, is specified. Then the fusion processing portion 41 obtains, by calculating and measuring, the inclination in the image, i.e., the inclination in the image in the image data, for this object region.

Next, in step S15, the collision determining portion 43 determines whether the angle of the inclination in the image obtained by the fusion processing portion 41 is greater than a threshold value (i.e., the empirically obtained angle of several tens of degrees, for example). If it is not determined that the obtained angle of inclination in the image is greater than the threshold value (i.e., if it is determined that that the obtained angle of inclination in the image is equal to or less than the threshold value), this cycle of the routine ends. If, on the other hand, it is determined that the obtained angle of inclination in the image is greater than the threshold value, the process proceeds on to step S16 described next.

In step S16, the fusion processing portion 41 calculates the pre-correction horizontal width W related to the object region, and then the numerical value calculating portion 42 estimates the length D in the image depth direction related to the object region, based on the inclination in the image obtained by the fusion processing portion 41. Then the collision determining portion 43 corrects the pre-correction horizontal width W calculated by the fusion processing portion 41 to the post-correction horizontal width T by reducing it based on the length D in the image depth direction estimated by the numerical calculating portion 42.

Incidentally, the estimation of the length D in the image depth direction of the object in the first example embodiment may be performed in combination with the estimation of the length D in the image depth direction of the object in the second example embodiment. That is, the numerical value calculating portion 42 may also estimate the length D in the image depth direction based on the difference between the first distance to the first detection point and the second distance to the second detection point in the first example embodiment, and the inclination in the image obtained by the fusion processing portion 41 in the second example embodiment.

Next, the operation and effect of the object detecting device 10 will be described. As described with reference to FIG. 3, an object is detected by image processing from image data for a predetermined area has been captured, and the pre-correction horizontal width W of the detected object (i.e., the width at which the detected object sticks out into the road R) is calculated by image processing. Then the length D in the image depth direction of the calculated pre-correction horizontal width W is estimated by image processing, and this calculated pre-correction horizontal width W is corrected to the post-correction horizontal width T (i.e., a width at which the detected object does not stick out into the road R) based on the estimated length D in the image depth direction.

In this way, after the pre-correction horizontal width W has been calculated from the image data, it is then corrected based on the estimated length D in the image depth direction. Therefore, the horizontal width of an object in faint of the host vehicle C can be more accurately estimated. Accordingly, it is possible to improve the determination accuracy of a determination to appropriately and correctly determine whether an object is an obstacle that requires an operational response (i.e., evasive action) by the host vehicle C (such as a response by a PCS (Pre-Collision System), i.e., a response by the activation of a system to reduce damage resulting from a collision). As a result, unnecessary warnings or control based on that response can be reduced.

Also, millimeter waves that are electromagnetic waves are emitted within a predetermined area, and the detection point of an object in the direction in which these millimeter waves are emitted can be obtained together with the distance data. Then, the image processing region that includes the predetermined detection target object is set from the image data based on the obtained detection point and the distance data, and the object is detected by performing image processing on this image processing region. In this way, the detection point is obtained together with the distance data, using the millimeter waves from the millimeter wave radar 2, and an object is detected from the image data based on the obtained detection point and the distance data (i.e., sensor fusion is performed). As a result, an object that is difficult to detect using only the monocular camera 1 can be detected more accurately, and information related to the distance of that object can be obtained more accurately.

Further, the length D in the image depth direction is estimated based on the difference between the first distance from the host vehicle C to the first detection point of the object in the image data and the second distance from the host vehicle C to the second detection point of that object obtained by the millimeter wave radar 2, so the length D in the image depth direction can be detected more accurately.

Also, if it is determined that the detected object is a vehicle, the pre-correction horizontal width W is not corrected, so the horizontal width related to an object with relatively no depth, such as the rear surface portion of a vehicle body of the detected vehicle, and in which the horizontal width does not need to be corrected can be detected more accurately.

Also, the length D in the image depth direction is estimated based on the inclination in the image of the object region in the obtained image data of the object. Therefore, when the inclination in the image of the object region in the image data is greater than it is when the detected object is a vehicle, as it is with an object that is long in the depth direction (i.e., that extends into the distance) and curves ahead, such as a guardrail G or a wall in front of the host vehicle C, the length D in the image depth direction is estimated accordingly. On the other hand, when the inclination in the image of the object region in the image data is smaller than it is with an object that is long in the depth direction (i.e., that extends into the distance) and curves ahead, as it is with a vehicle in front of the host vehicle C, the length in the horizontal direction (i.e., the width direction) is accordingly estimated to be longer than the length D in the image depth direction.

In the first and second example embodiments of the invention, the millimeter radar 2 is used as the radar detecting means. However, in a modified example, the radar detecting means may emit electromagnetic waves of another wavelength. For example, a laser radar may be used as the radar detecting means.

Accordingly, the invention makes it possible to provide an object detecting device capable of improving the determination accuracy of a determination as to whether an object in front of the host vehicle is an object that requires an operational response (i.e., evasive action) by the host vehicle, by more accurately estimating the horizontal width of that object.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. An object detecting device comprising:
   image detecting portion that detects an object from image data for a predetermined area that has been captured;
   calculating portion that calculates a horizontal width of the object detected by the image detecting portion;
   estimating portion that estimates a length in an image depth direction of the object detected by the image detecting portion;
   correcting portion that corrects the horizontal width of the object calculated by the calculating portion, based on the length in the image depth direction estimated by the estimating portion;
   inclination obtaining portion that obtains an inclination of an object region occupied by the object in the image data of the object detected by the image detecting portion, wherein the estimating portion estimates the length in the image depth direction of the object based on the inclination of the object region obtained by the obtaining portion; and
   determining portion that determines whether the inclination of the object region is greater than a predetermined value; wherein
   the inclination of the object region is an angle between a longitudinal direction of the object region in the image data and a horizontal direction of the image data; and
   the correcting portion is inhibited from correcting the horizontal width of the object calculated by the calculating portion if it is determined by the determining portion that the inclination of the object region is equal to or less than the predetermined value.

2. The object detecting device according to claim 1, further comprising radar detecting portion that emits electromagnetic waves within the predetermined area and obtains a detection point of an object in a direction in which the electromagnetic waves are emitted, wherein the image detecting portion detects the object from the image data based on the detection point obtained by the radar detecting portion.

3. The object detecting device according to claim 2, wherein a plurality of the detection points are obtained by the radar detecting portion; the estimating portion estimates the length in the image depth direction of the object based on a difference between a first distance to a first detection point and a second distance to a second detection point obtained by the radar detecting portion; and the first detection point and the second detection point are within the range of the horizontal width of the object.

4. The object detecting device according to claim 3, wherein the determining portion is adapted to determine whether the object detected by the image detecting portion is a vehicle, wherein the correcting portion is inhibited from correcting the calculation result of the horizontal width if it is determined by the determining portion that the object is a vehicle.

5. The object detecting device according to claim 4, wherein the determining portion determines whether the obtained difference between the first distance to the first detection point and the second distance to the second detection point is equal to or greater than a fixed difference; and the correcting portion is inhibited from correcting the horizontal width if it is determined by the determining portion that the object is a vehicle and it is not determined that the distance is equal to or greater than a fixed difference.

6. The object detecting device according to claim 2, wherein the predetermined area is set based on the detection point obtained by the radar detecting portion.

7. The object detecting device according to claim 1, wherein the image depth direction is a direction from the image detecting portion to the object.

8. The object detecting device according to claim 7, wherein the horizontal direction is a direction orthogonal to the direction from the image detecting portion to the object.

9. The object detecting device according to claim 1, wherein the object is within the predetermined area.

* * * * *